United States Patent Office 3,767,719
Patented Oct. 23, 1973

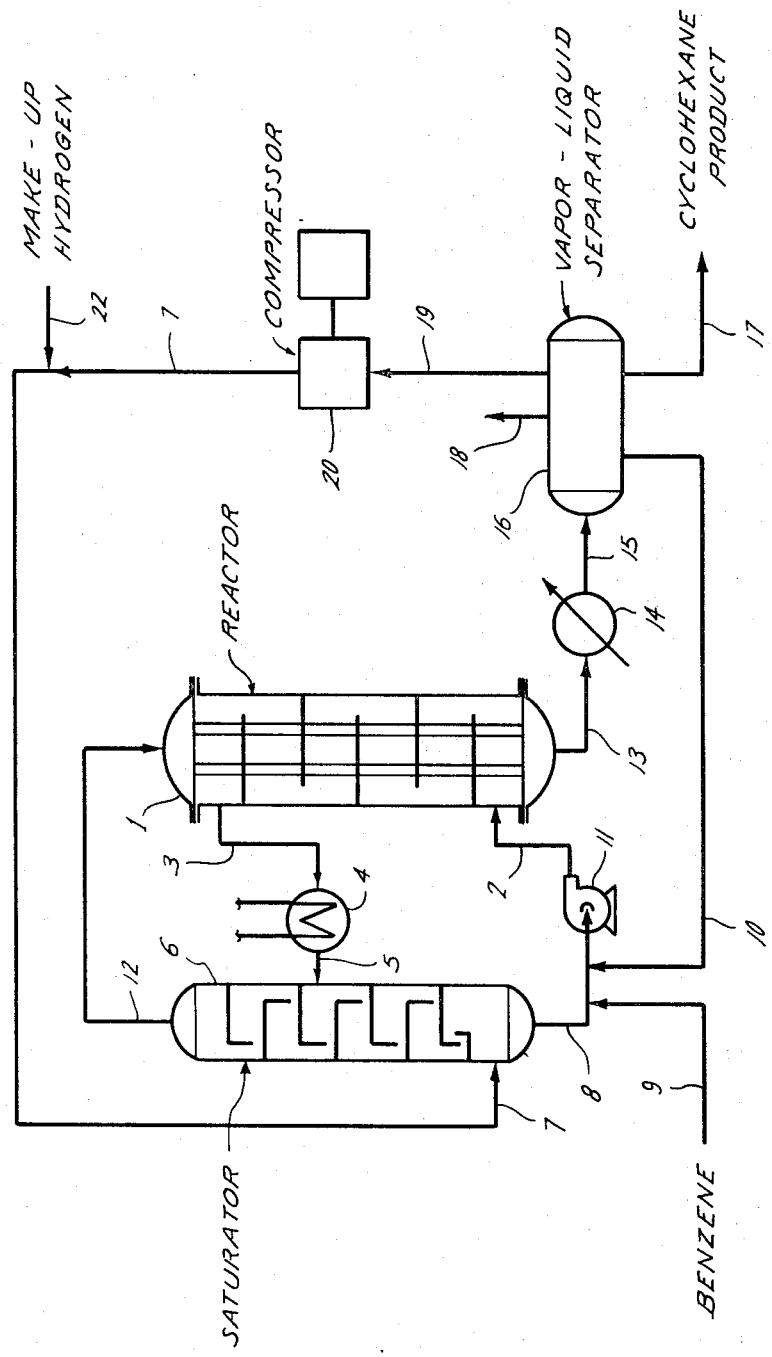

3,767,719
HYDROGENATION OF BENZENE TO
FORM CYCLOHEXANE
James H. Colvert, Edward F. Janes, Harold C. Kaufman, and Randlow Smith, Houston, Tex., assignors to Texaco Inc., New York, N.Y.
Filed Dec. 16, 1971, Ser. No. 208,730
Int. Cl. C07c *149/00*
U.S. Cl. 260—667                                                7 Claims

ABSTRACT OF THE DISCLOSURE

A process for hydrogenating benzene in the vapor phase with molecular hydrogen in a reaction zone in the presence of diluent cyclohexane vapor and a hydrogenation catalyst wherein a portion of the heat of reaction is absorbed from the reaction zone by indirect heat transfer means into a circulating liquid stream comprising cyclohexane and benzene and wherein such heated circulating liquid stream is contacted with a molecular hydrogen containing gas to form a vaporized reaction charge mixture comprising benzene, hydrogen and diluent cyclohexane. Reaction zone temperatures are maintained within a desirable operating range by absorbing heat from the reaction zone into the circulating liquid stream and such absorbed heat is subsequently utilized to vaporize the benzene and cyclohexane components of the reaction charge mixture and to preheat the reaction charge mixture to the desired reaction inlet temperature.

BACKGROUND OF THE INVENTION

The present invention relates to a process for manufacturing cyclohexane by reacting benzene with hydrogen in the presence of a hydrogenation catalyst. More particularly, the present invention comprises an improved method for controlling the hydrogenation reaction temperature and providing a vaporized reaction charge mixture of selected composition.

Methods for manufacturing cyclohexane by hydrogenating benzene are well known. Such a hydrogenation reaction is highly exothermic and in commercial processes various means are employed for controlling the reaction temperature. For instance a recycle stream of cyclohexane product may be returned to the reaction zone inlet along with the benzene reactant. The cyclohexane recycle absorbs a substantial portion of the heat of reaction. Hydrogen may be supplied into the reaction zone in a large stoichiometric excess over that required to hydrogenate the benzene wherein the excess hydrogen absorbs a portion of the heat of reaction. Additionally, quench streams comprising cyclohexane and/or hydrogen may be introduced into the reaction zone at selected points to absorb a portion of the liberated heat of reaction. By employing these means, the reaction zone temperature may be controlled within a desired operating range.

In addition to the hydrogenation reaction, the hydrocarbons, benzene and cyclohexane, tend to crack in the presence of a hydrogenation catalyst. The cracking reaction which is also highly exothermic increases in rate with increasing temperature. Therefore, the hydrogenation reaction operating temperature is maintained within critical limits. The lower value for the operating temperature is sufficiently high to allow the hydrogenation reaction to proceed at a reasonable rate. The upper operating temperature limit is below the temperature at which the cracking reaction achieves a substantial rate. Should the operating temperature exceed this upper limit, two undesirable phenomena may occur. One phenomenon is the production of undesirable by-products of a cracking reaction which reduces the cyclohexane product purity. Such an undesirable cracking reaction may occur at localized "hot spots" within a catalyst bed which exceed the upper temperature limit even though the bulk temperature of the catalyst bed does not exceed such upper temperature limit. The second phenomenon is a runaway cracking reaction which may occur when the bulk temperature of the catalyst bed exceeds the upper operating temperature limit. During such a runaway cracking reaction heat is liberated much faster than it can be removed from the reaction zone and the temperature in the reaction zone may rise extremely rapidly to a very high value of up to 1500° F. and higher. Such high temperatures usually destroy the catalyst in the reaction zone and may cause damage to the mechanical equipment employed in the process. The failure of any one of the heat removal means for even a very short time may allow the reaction zone temperature to exceed this upper critical limit, thereby initiating a runaway cracking reaction.

SUMMARY OF THE INVENTION

Now according to the method of the present invention, an improved process for hydrogenating benzene to produce cyclohexane is disclosed. Benzene is reacted with hydrogen in the vapor phase at an elevated temperature and pressure in the presence of a hydrogenation catalyst. Cyclohexane is employed in the reaction zone to absorb a portion of the liberated heat of reaction. The improvement of the present invention comprises absorbing heat from a reaction zone into a circulating liquid stream comprising a major amount of cyclohexane and a minor amount of benzene; contacting the heat-containing circulating liquid stream with a gas stream comprising hydrogen in a saturation zone; and charging a vapor stream comprising hydrogen, benzene, and cyclohexane as reaction charge mixture to the reaction zone inlet. The unvaporized portion of the circulating liquid from the saturation zone is circulated along with fresh feed benzene and recycled cyclohexane to absorb additional heat from the reaction zone. From the reaction zone a product stream comprising hydrogen and cyclohexane is passed into a recovery zone wherein product cyclohexane is separated from the hydrogen.

Advantages of employing the circulating liquid stream include the ability to closely control the reaction zone temperature, and the temperature rise through the reaction zone may be limited to a small value. In obtaining a reaction mixture charge vapor from the saturation zone by contacting the recirculating liquid stream with a hydrogen stream, the opportunity for runaway cracking reactions in the reaction zone is substantially reduced. For instance, should the flow of circulating liquids be interrupted, then only hydrogen gas would be charged to the reaction zone, and should the flow of the recycled cyclohexane be interrupted then the inventory of cyclohexane in the circulating liquid stream would allow some time for taking corrective action before the reaction zone temperature increased to a runaway condition. These and other advantages of the present invention will be more fully described in the detailed description which follows.

BRIEF DESCRIPTION OF THE DRAWING

The drawing is a schematic representation of a cyclohexane process employing the improvements of the present invention.

DETAILED DESCRIPTION OF THE INVENTION

For a cyclohexane process within the contemplation of the present invention, benzene is reacted with hydrogen to form cyclohexane. Fresh benzene of less than 100 percent purity may be employed. However, a fresh feed benzene stream consisting essentially of benzene is preferred in order to obtain a high purity cyclohexane product.

The hydrogen employed in such a cyclohexane process need not be 100 percent pure. Hydrogen streams which are commonly available from refinery processes may be employed in this process. A hydrogen stream of about 75 percent purity, with the impurities comprising light hydrocarbon such as methane and ethane, may be employed in such a cyclohexane process. Advantageously, hydrogen may be recovered from the reaction zone effluent and recycled to the cyclohexane process. A hydrogen bleed stream may be removed from the hydrogen recycle stream to prevent a buildup of light hydrocarbons, and fresh hydrogen may be added to the recycle hydrogen stream to make up for the hydrogen consumed in the reaction and removed via the bleed stream. Preferably the makeup hydrogen is essentially free of catalyst poisons, particularly sulfur compounds, thereby allowing extended time periods throughout which the catalyst is effective for hydrogenating benzene. Preferably, hydrogen is present in the reaction zone charge stream in excess of the stoichiometric ratio required to saturate the benzene. Molar ratios of hydrogen to benzene in the reaction zone charge stream of from about 6/1 to about 15/1 or higher may be employed. Preferably hydrogen to benzene molar ratios of from about 8/1 to about 10/1 are employed. A stoichiometric excess of hydrogen in the reaction zone favors the hydrogenation reaction of benzene, additionally the excess hydrogen absorbs a portion of the exothermic heat of reaction resulting from the hydrogenation of benzene.

Cyclohexane, which is substantially unreactive under the reaction zone conditions, may be charged to the reaction zone along with the hydrogen and benzene reactants. The cyclohexane thus charged is employed as a diluent and absorbs a portion of the exothermic heat of reaction. Molar ratios of cyclohexane to benzene of from about 1/1 to about 10/1 are preferred.

Hydrogenation catalysts are employed in the reaction zone. Such catalysts may comprise any catalyst suitable for the hydrogenation of benzene. Examples of such catalysts include nickel, platinum, palladium, cobalt, iron, their compounds and mixtures thereof. Such catalyst may be unsupported or supported upon a relatively inert base. Preferably the catalyst is supported upon a refractory oxide base such as magnesia, zirconia, alumina and kieselguhr.

Temperatures which may be employed in the reaction zones have an upper limit and a lower limit which depend somewhat upon the particular hydrogenation catalyst employed. Generally, temperatures in the range of from about 100° F. to about 600° F. may be employed. Preferably, temperatures in the range of from about 250° F. to about 400° F. are employed. At temperatures below about 100° F. the hydrogenation reaction will not proceed or proceeds so slowly as to be uneconomical. At temperatures above about 600° F., the rate of cracking becomes substantial, the reaction becomes extremely difficult to control, and the yield of product cyclohexane is substantially reduced.

Although the hydrogenation reaction may be carried out in the mixed phase, it is preferably carried out in the vapor phase. When a vapor-liquid mixture is present in the reaction zone, channeling of reactants is more likely to occur thus creating "hot spots" (localized areas of increased temperature) and increasing the likelihood that a runaway reaction may develop.

Preferably, the pressure of the reaction zone is such that the reactants are in the vapor phase at the reaction zone inlet temperature. However, increased pressures favor the hydrogenation of benzene. Therefore, it is desirable that the reaction zone be operated at a super atmospheric pressure such that the reactants are still in the vapor phase. Pressures of from about atmospheric pressure to about 600 p.s.i.g. may be employed. The exact pressure which may be employed and still maintain the reactants in the vapor phase will depend upon the composition of the reaction charge mixture and the reaction zone inlet temperature. Higher operating pressures may be employed by increasing the molar ratio of hydrogen to hydrocarbon reactants in the reaction charge mixture.

According to the method of the present invention, a circulating liquid stream comprising benzene and cyclohexane is employed to absorb a substantial portion of the exothermic heat of reaction from the reaction zone. Therefore, indirect heat exchange is established between the circulating liquid and the reaction mixture present in the reaction zone. Such heat exchange may be established by selecting an appropriate reactor configuration. One particularly effective reactor configuration comprises a tubular reaction zone having an inlet and outlet means encompassed by an annular jacket. Catalyst is disposed within the tubular reaction zone and the reaction mixture vapor is charged to the inlet means thereof. The circulating liquid flows within the annular jacket, absorbing heat through the wall of the tubular reaction zone. The diameter of the tubular reaction zone should be relatively small in order to allow efficient transfer of heat from the center of the tube to the wall. Tube diameters of from about 1 inch to about 6 inches are preferred. For large reaction charge mixture flow rates, tubular reaction zones in parallel may be used to advantage. In such a case, the parallel tubular reaction zones may be enclosed within a shell to form a reactor within which the vaporized reaction mixture flows through the parallel tubes and the circulating liquid flows through the enclosing shell. Baffles may be advantageously used within the shell to improve the flow distribution of the circulating liquid across the outer surfaces of the tubes. One or more tubular reactors may be employed in series to obtain the desired degree of benzene conversion. Preferably, essentially all the benzene is converted in the reaction zone before product cyclohexane is recovered.

The circulating liquid stream, by absorbing a portion of the heat of reaction from the reaction zone, limits the temperature rise experienced by the reaction mixture as it passes through the reaction zone. Heat is removed from the circulating liquid leaving the reaction zone by vaporizing a portion of the circulating liquid into a hydrogen stream in a saturation zone. From the saturation zone the vapor stream enters the reaction zone as reaction charge mixture. Unvaporized liquid is circulated from the saturation zone to the reaction zone wherein the circulating liquid absorbs additional heat. Fresh benzene and recycled cyclohexane are added to the circulating liquid to make up for the amount vaporized and passed into the reaction zone.

The temperature at which the circulating liquid vaporizes in the presence of the hydrogen stream in the saturation zone determines the inlet temperature to the reaction zone. The temperature at which the circulating liquid leaves the reaction zone is determined by the temperature at which said liquid enters the reaction zone and upon the amount of heat absorbed within the reaction zone. Thus, the temperature of the circulating liquid leaving the reaction zone may not be appropriate to provide the desired inlet temperature of the reaction mixture to the reaction zone. Therefore, heat exchange means may be employed to abstract or add heat as required to adjust the temperature of the circulating liquid stream as it enters the saturation zone. Heat exchange means such as hot oil exchangers, fired heaters, etc. may be employed as required to add heat to the circulated liquid stream, and heat exchange means such as water coolers and air coolers, etc. may be employed as required to abstract heat from the circulating liquid stream.

In the saturation zone, the heat containing circulating liquid stream is contacted with a hydrogen stream which comprises the hydrogen component of the reaction charge mixture. A portion of the circulating liquid stream is vaporized to provide the benzene and cyclohexane components of the reaction charged mixture. Heat is transferred, by direct contact, from the circulating liquid stream to the hydrogen stream such that the vapor leaving the saturation zone is at about the desired inlet temperature of the reaction mixture to the reaction zone. In order for proper vaporization of the circulating liquid and efficient heat exchange to occur in the saturation zone, good contact must be maintained between the circulating liquid stream and the hydrogen stream. In order to obtain the necessary contact between the hydrogen stream and the circulating liquid stream, the saturation zone may comprise a column or a vessel equipped with vapor-liquid contacting means such as trays, sieve decks, metallic packing, ceramic packing, etc. Preferably the vapor stream recovered from the saturation zone as reaction charge mixture is free from entrained liquids. Therefore, the saturation zone may be advantageously equipped with vapor-liquid separation means such as demister pads, etc. to prevent the carryover of entrained liquid with the vapor.

The ratio of cyclohexane to benzene in the circulating liquid stream will determine the ratio of cyclohexane to benzene in the reaction charge mixture. Therefore, the composition of the circulating liquid stream is selected such that upon evaporation, the ratio of cyclohexane to benzene in the vapor recovered from the saturation zone is the desired ratio for charge to the reaction zone. In order to maintain the desired ratio of cyclohexane to benzene in the circulating liquid stream, fresh benzene and recycle cyclohexane are added to the circulation stream at rates equal to the rates benzene and cyclohexane are vaporized from the circulating liquid stream.

The method of the present invention may be better understood by reference to the attached drawing which is a schematic flow diagram illustrating one embodiment of the present invention. In the following description of the drawing it will be understood that the drawing has been simplified by the omission of certain conventional elements such as valves, pumps, compressors, and the like which may be conveniently added by one skilled in the art. The drawing and the description which follows are merely illustrative and are not intended to limit the invention since many modifications within the spirit and scope of the appended claims will be obvious to those skilled in the art.

In the description of the drawing which follows stream compositions are expressed in mole percent (mol percent), temperatures in degrees Fahrenheit (°F.), and pressures in pounds per square inch gauge (p.s.i.g.) unless otherwise specified. Stream flow rates are given as pound molecular weights per hour (mols/hr.).

In the drawing, 16,256 mols/hr. of a circulating liquid stream comprising 26% benzene and 69.8% cyclohexane at a temperature of 322° F. and a pressure of 600 p.s.i.g. enters the shell side of reactor 1 via line 2. Reactor 1 comprises tubular elements in parallel connection contained within a shell. The tubular elements are equipped with an inlet and an outlet means and contain hydrogenation catalyst comprising about 50 weight percent nickel supported upon alumina. In the shell side of reactor 1 the circulating liquid contacts the tubular elements, absorbing heat therefrom and the heated circulating liquid is withdrawn from reactor 1 via line 3 at a temperature of 366° F. From line 3 the circulating liquid passes into heater 4 wherein the circulating liquid is heated further. From heater 4 the circulating liquid passes via line 5 into saturator 6. Saturator 6 comprises a vessel equipped with vapor-liquid contact means, overhead vapor recovery means, and bottoms liquid recovery means. 4267 mols/hr. of a gas stream comprising 84.7% hydrogen, at a temperature of 100° F., enters saturator 6 at a point below the vapor-liquid contact means via line 7. In saturator 6 a portion of the circulating liquid stream comprising 453 mols/hr. benzene and 1136 mols/hr. cyclohexane is vaporized and the hydrogen containing gas is heated by direct heat exchange with the unvaporized circulating liquid. Unvaporized circulating liquid passes downward and is removed from saturator 6 via line 8. 453 mols/hr. of 100% benzene in line 9 and 1109 mols/hr. of 100% cyclohexane in 1176 mols/hr. of cyclohexane recycle in line 10 are added to the circulating liquid stream in line 8 to replace the benzene and cyclohexane vaporized in saturator 6. From line 8 the circulating liquid stream passes through pump 11 into line 2 from which the circulating liquid stream enters the shell side of reactor 1 to absorb additional heat as hereinabove described.

From the saturator 6, 5896 mols/hr. of a vapor stream comprising 61.7% hydrogen, 7.7% benzene and 19.2% cyclohexane is recovered via line 12 at a temperature of 343° F. and a pressure of 565 p.s.i.g. From line 12 the vapor stream enters the catalyst containing tubes of reactor 1 wherein benzene is hydrogenated to form cyclohexane. From the tube outlet means of reactor 1, a reaction product vapor stream comprising 50.1% hydrogen, 11.6% methane, 3.3% ethane and 35.0% cyclohexane is recovered at a rate of 4538 mols/hr., at a temperature of 400° F. and a pressure of 545 p.s.i.g. via line 13. From line 13 the reaction product vapor passes into condenser 14 wherein the reaction product vapor is partially condensed and is cooled to a temperature of about 100° F. From condenser 14, condensate and noncondensed vapors pass via line 15 into a separator vessel 16 wherein the condensate is separated from the noncondensed vapors.

From the separator vessel 16 a stream of noncondensed gases is vented at a rate of 303 mols/hr. via line 18 to remove cracked products such as methane and ethane from the cyclohexane process. A noncondensed gas stream passes from the separation vessel 16 via line 19 at a rate of 2581 mols/hr. into compressor 20 wherein the noncondensed gas stream is compressed to a pressure of about 600 p.s.i.g. From compressor 20 the compressed gas stream passes into line 7 for recycle to saturator 6. A makeup hydrogen stream comprising about 95% hydrogen is added to the recycle gas stream in line 7 via line 22 at a rate of about 1686 mols/hr.

From the separator vessel 16 a recycle cyclohexane stream is withdrawn via line 10 for addition to the circulating liquid stream in line 8 as hereinabove described. A cyclohexane product stream comprising about 94% cyclohexane is withdrawn at a rate of about 477 mols/hr. from the separator vessel 16 via line 17 and is passed into a purification zone, not shown.

We claim:

1. In a continuous process for manufacturing cyclohexane, wherein a vaporized reaction mixture comprising benzene, hydrogen and cyclohexane is reacted in the presence of a hydrogenation catalyst at an elevated temperature and pressure in a reaction zone, and wherein cyclohexane is recovered from the reaction zone effluent; the improvement which comprises:
    (a) Transferring, by indirect heat exchange, heat of reaction from the reaction zone into a circulating liquid stream comprising cyclohexane and benzene;
    (b) Contacting the heated circulating liquid stream with a hydrogen containing gas stream for vaporization of a minor portion of said circulating liquid stream;
    (c) Charging the resulting vapor, comprising hydrogen, benzene and cyclohexane as a reaction mixture to the reaction zone; and
    (d) Circulating the unvaporized portion of the circulating liquid stream for exchange of additional heat of reaction from said reaction zone.

2. The method of claim 1 wherein the circulating liquid stream is partially vaporized in the presence of the hydrogen containing stream in a saturation zone; and wherein benzene and cyclohexane are added to the circulating liquid stream to replace the benzene and cyclohexane vaporized in the saturation zone.

3. The method of claim 2 wherein the molar ratio of cyclohexane to benzene in the circulating liquid is from about 1/1 to about 10/1 and wherein the molar ratio of hydrogen to benzene in the reaction charge vapor is from about 6/1 to about 15/1.

4. The method of claim 1 wherein the reaction zone temperature is from about 100° F. to about 600° F.; and wherein the heat content of the circulating liquid is adjusted to maintain the desired reaction zone operating temperature.

5. A cyclohexane manufacturing process, which comprises:
   (a) Absorbing heat, by indirect heat exchange means, from a reaction zone into a circulating liquid stream comprising benzene and cyclohexane;
   (b) Partially vaporizing a minor portion of the heated circulating liquid stream in the presence of a hydrogen containing gas stream to form a vapor fraction comprising hydrogen, cyclohexane and benzene, and a cooled liquid fraction comprising cyclohexane and benzene;
   (c) Reacting, in the reaction zone, the vapor fraction in the presence of a hydrogenation catalyst selected from the group consisting of nickel, platinum, palladium, cobalt, iron, their compounds, and mixtures thereof, at a temperature in the range of about 100–600° F. and at a superatmospheric pressure; and
   (d) Recovering cyclohexane from the reaction zone effluent.

6. The method of claim 5 wherein unvaporized circulating liquid is circulated to absorb additional heat from the reaction zone; and wherein benzene and cyclohexane are added to the circulating liquid to replace the portion vaporized.

7. The method of claim 6 wherein the molar ratio of cyclohexane to benzene in the circulating liquid is from about 1/1 to about 10/1; and wherein the molar ratio of hydrogen to benzene in the reaction charge vapor is from 6/1 to about 15/1.

References Cited

UNITED STATES PATENTS

| 2,515,279 | 7/1950 | Der Hoeven | 260—667 |

FOREIGN PATENTS

| 1,187,749 | 4/1970 | Great Britain | 260—667 |
| 3,097 | 5/1968 | Japan | 260—667 |
| 1,184,756 | 1/1965 | Germany | 260—667 |

DELBERT E. GANTZ, Primary Examiner

J. M. NELSON, Assistant Examiner